Feb. 14, 1956          J. A. LARCÉN          2,734,724
APPARATUS FOR RIGGING OR SUPPORTING ROCK DRILLS
Filed July 3, 1951          5 Sheets-Sheet 1
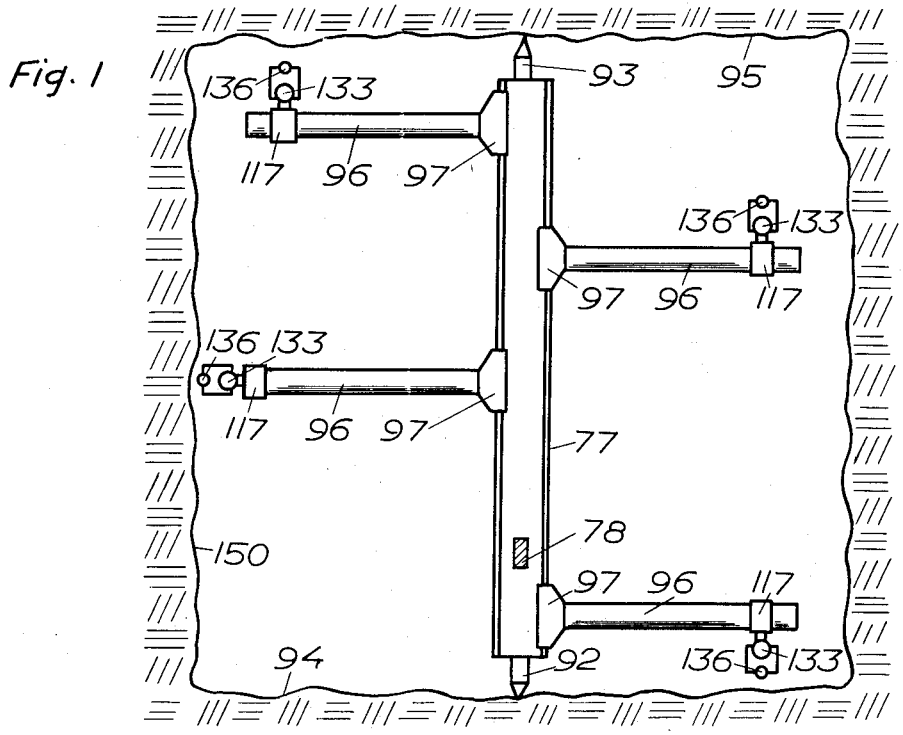
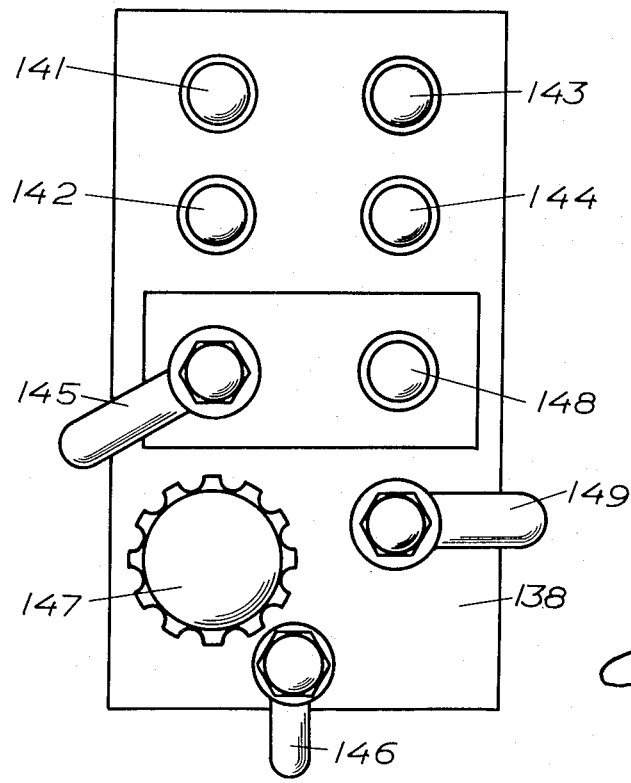

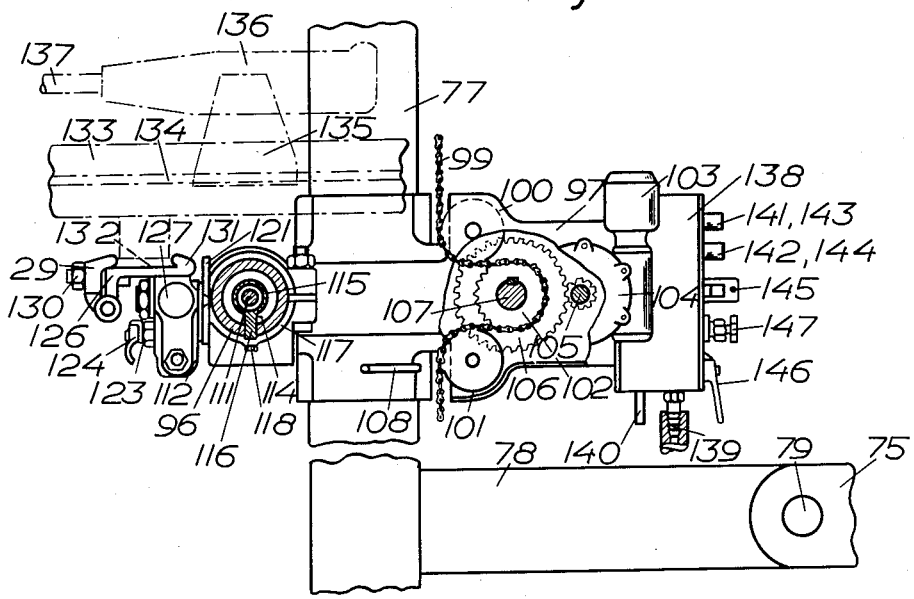

Feb. 14, 1956  J. A. LARCÉN  2,734,724
APPARATUS FOR RIGGING OR SUPPORTING ROCK DRILLS
Filed July 3, 1951  5 Sheets-Sheet 3

INVENTOR.
Jan August Larcén
BY Jarvis C. Marble
his Attorney

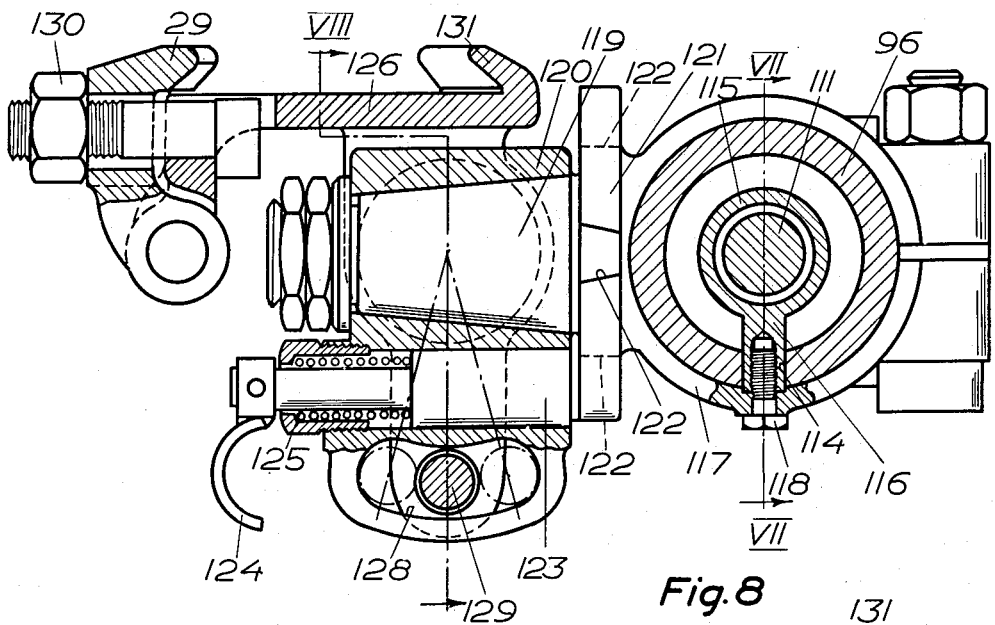
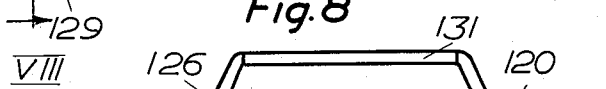
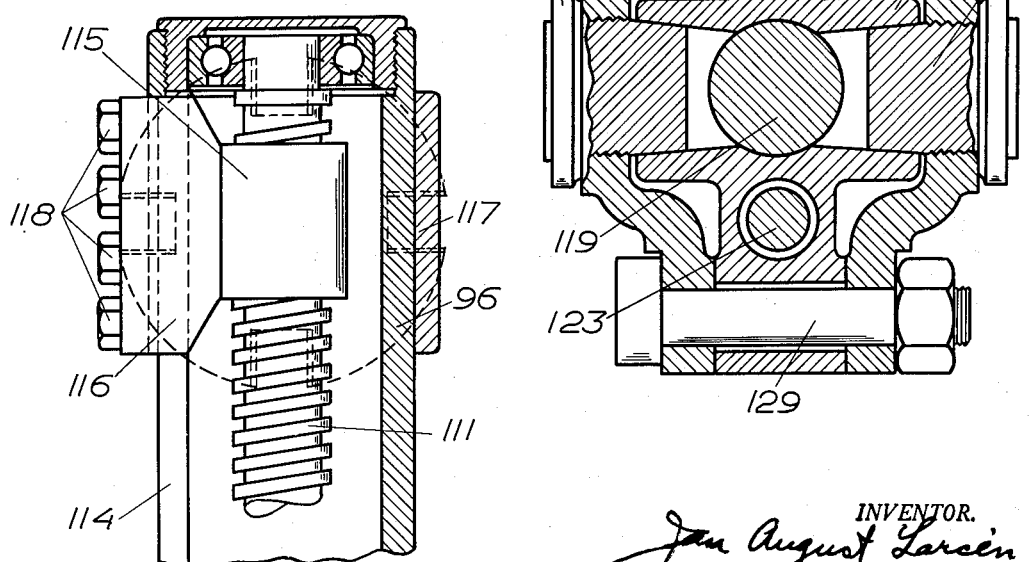

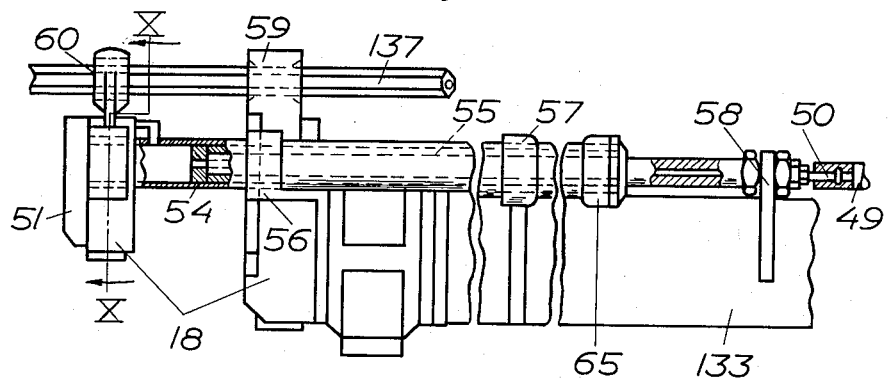
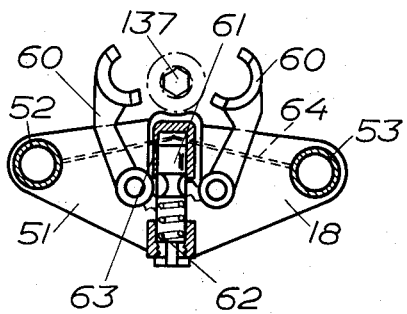
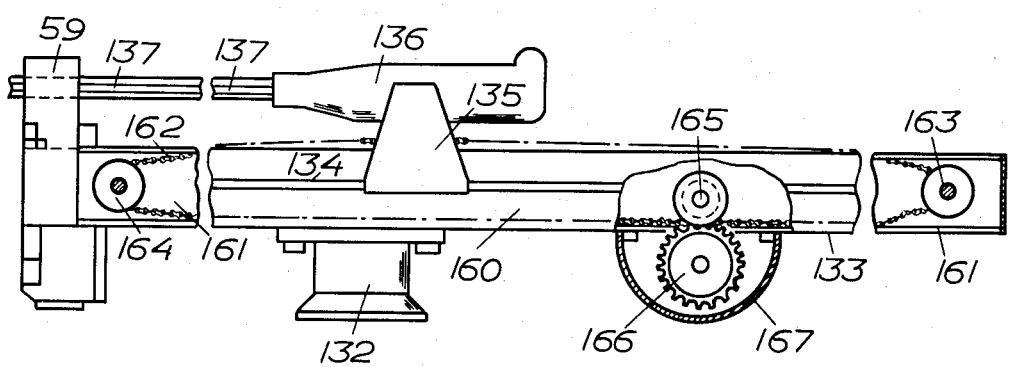

United States Patent Office 2,734,724
Patented Feb. 14, 1956

2,734,724

APPARATUS FOR RIGGING OR SUPPORTING ROCK DRILLS

Jan August Larcén, Stockholm, Sweden, assignor to Aktiebolaget Atlas Diesel, Nacka, Sweden, a corporation of Sweden Application July 3, 1951, Serial No. 234,935

Claims priority, application Sweden July 3, 1950

6 Claims. (Cl. 255—53)

This invention relates to apparatus for rigging or supporting rock drills. One object of the invention is to make possible a rapid drilling of groups of drill holes in tunnels, mines or the like. A further object of the invention is to provide apparatus by means of which the driller is relieved from the heavy work of handling drills and drill feeds. A still further object of the invention is to provide an apparatus by means of which one man may operate two or more drills simultaneously. For these and other purposes I provide a drill rig or drill supporting apparatus comprising a substructure, guiding means on said substructure forming an angle with each other, one of said guiding means being movable parallel to itself on said other guiding means, a feed bar or cradle movable parallel to itself on said first mentioned guiding means, and arranged for feeding a rock drill, and motors for moving the first mentioned guiding means on the second guiding means and said feed bar or cradle on the first mentioned guiding means, and means spaced from the feed bars or cradles for controlling the feeding motion of the rock drills along the feed bars or cradles and for controlling the motion of the feed bars or cradles by means of the motors.

Figure 4:
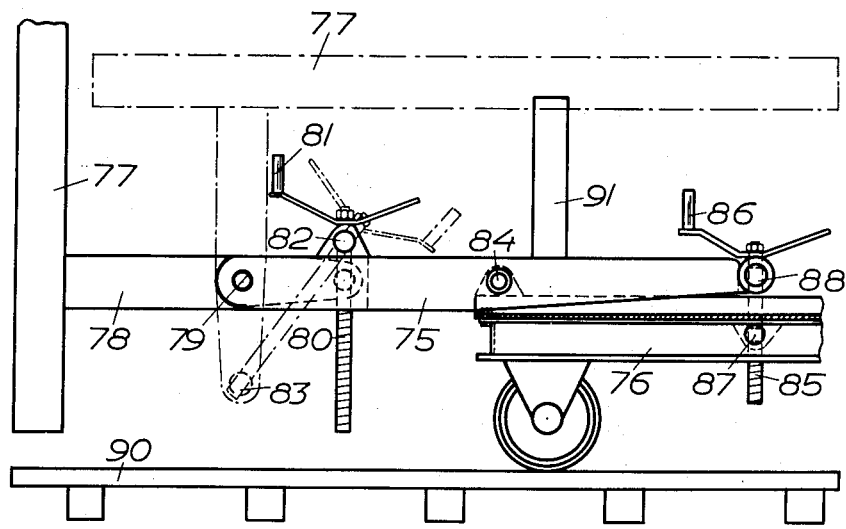

In the accompanying drawings one embodiment of an apparatus for rigging or supporting rock drills according to the invention is illustrated by way of example. Fig. 1 is a diagrammatic view of a tunnel section in which an apparatus according to the invention is provided. Fig. 2 is a side view and Fig. 3 a plan view of a portion of the apparatus according to Fig. 1, in which feed bars or cradles are movable on horizontal cross bars which are themselves movable on a vertical column. Fig. 4 is a side view and Fig. 5 a plan view on a somewhat larger scale of the rear portion of the drill rig according to Figs. 1, 2 and 3 and of a trolley forming a part thereof. Fig. 6 is a section on a larger scale of the mechanism for securing a feed bar or cradle to a horizontal or cross bar according to Figs. 1–3. Fig. 7 is a section on line VII—VII in Fig. 6, and Fig. 8 is a section on line VIII—VIII in Fig. 6. Fig. 9 illustrates a partially broken side view of one of the feed bars, and Fig. 10 is a section on line X—X in Fig. 9. Fig. 11 is a view of a maneuvering casing. Fig. 12 illustrates a feed bar in side view and partially in section.

Figure 5:
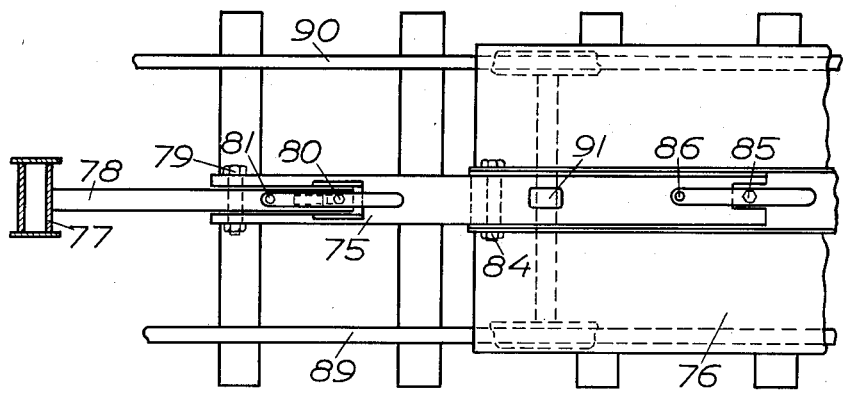

The general arrangement of a drill rig or drill supporting apparatus according to the invention is illustrated in Figs. 1–5. This drill rig consists of a substructure which in the illustrated embodiment comprises a beam 75 mounted on a trolley 76 and a vertical column 77 having horizontal cross bars carried thereon. The substructure may naturally be of various other designs according to the conditions of operation and other local arrangements. The column 77 is provided near the lower end with an arm 78 which is journalled on a bolt 79 on the beam 75 so that the column may be tilted from vertical to horizontal position as indicated in dot and dash lines in Fig. 4. The arm 78 is swingable by means of a screw mechanism 80 and a crank 81 relative to the beam 75. The screw 80 is journalled in a disc 82, which is rotatably journalled on the beam 75, and engages a screw threaded hole in a pin 83 rotatable in the end of the arm 78. The beam 75 is swingable on a bolt 84 on the trolley 76 and may be set in different positions by means of a screw 85 and a crank 86. The screw 85 engages a screw threaded hole in a pin 87 rotatably journalled on the trolley 76, and the screw 85 is furthermore rotatably journalled in a disc 88 rotatably journalled at the end of the beam 75, as is obvious from Figs. 4 and 5. The trolley 76 may be moved on rails 89, 90. A support 91 is provided on the trolley 76, and the column 77 may be tilted to rest on said support when the drill rig is turned down for transportation, as indicated by dot and dash lines in Fig. 4. Figs. 4 and 5 show the front end of the trolley 76 only whereas the rear end with a further pair of wheels has been omitted, since they are obviously of no importance for a correct understanding of the invention.

The column 77, as illustrated diagrammatically in Fig. 1, may be provided with spanner bolts 92, 93 at the top and bottom by means of which the column may be pneumatically or by other means fixed between the bottom 94 and the roof 95 of the tunnel or other space. The column has horizontal cross bars 96 movable up and down the column on guiding means formed on the column. For this purpose each cross bar 96 is held fixed in a carriage 97 the design of which is illustrated in detail in Figs. 2 and 3. The carriage 97 comprises a housing which is slideable on guide rails formed by the flanges 98 of the column 77. The carriage is movable by means of a chain 99 secured to the column 77 at the top and bottom thereof and carried over rollers 100, 101 and a sprocket wheel 102 journalled in the carriage 97 as shown in Fig. 2 in which a part of the wall of the carriage 97 has been broken away to show said rollers and sprocket. The carriage 97 carries a compressed air driven motor 103 which through a self-locking screw transmission 104 drives a pinion 105 which drives a toothed gear 106 secured on a shaft 107 common for the sprocket wheel 102 and the toothed gear 106. When the motor 103 is operated in one direction of rotation or the other the carriage 97 ascends or descends, respectively, on the chain 99. A wing bolt 108 is provided on the carriage 97 for locking said member on to the column 77, and said bolt also forms a safety device against breakage of the chain.

The carriage 97 forms a clamping device 109 which by means of a bolt 110 may be tightened around the tubular bar 96.

A screw 111 is mounted in bearings in both ends of the cross bar 96 and at the end of the bar adjacent the column 77 a reversible compressed air motor 112 and a self-locking screw transmission 113 are provided by means of which the screw 111 may be rotated in one direction or the other. On the underside the cross bar 96 is provided with a longitudinally extending slot 114 through which projects a wing portion 116 of a nut 115 movable on the screw. A sliding member 117 is movable along the tubular cross bar 96 and is secured to the wing portion 116 of the nut 115 by means of bolts 118. The sliding member 117 is moved on the cross bar 96 towards the column 77 or away from the column 77 upon operation of the motor 112 in one direction of rotation or the other which causes turning of the screw 111 in one direction or the other, respectively. The sliding member 117 carries a tapering trunnion 119, Fig. 6, on which a fixture 120 may be turned and locked in various turning positions. For this purpose the sliding member 117 is provided with a flange 121 having four recesses 122, which may be engaged by a lock bolt 123 reciprocable in the intermediate member 120. The lock bolt 123 has a handle 124 and is normally pressed by a spring 125 into engagement with one of the recesses 122, as shown in Fig. 6. Obviously, when the lock bolt 123 is pulled out of engagement with the recess 122, the fixture 120 is free to turn 90° or 180° in one direction or the other, and it may then again be locked by engagement of the lock bolt 123 in another recess 122. A support 126 for a feed bar or cradle is mounted to swing on bolts 127 on the fixture 120 so that the support may be swung through a certain small angle. Said swinging occurs in a plane perpendicular to the turning plane of the fixture 120 and is limited by the extent of an opening 128 in the fixture 120 through which a bolt 129 on the support 126 extends, as illustrated in Figs. 6 and 8. Upon swinging on the trunnions 119 a feed bar 133 secured in the support 126 may be dropped or raised a little from the normal horizontal position. The support 126 has a movable jaw 29 and a nut 130 by means of which the feed bar or cradle 133 may be pressed against a fixed jaw 131 with the foot piece 132, as is common practice in connection with means for supporting feed bars or cradles for rock drills.

The feed bar 133, a portion of which is indicated by dot and dash lines in Fig. 2 is illustrated in detail in Figs. 9 and 10. The feed bar is provided with guide rails 134, as indicated in Fig. 2, and a sliding bracket 135 for carrying a rock drill 136 operating on a drill rod 137. The rock drill may naturally be of any type such as a hammer drill or a rotary drill. The feed bar 133 may be of any conventional design and is illustrated in Fig. 12 as a chain feed bar comprising two channels 160, 161 between which a chain 162 connected to the drill and carried over rollers 163 and 164 is mounted. The chain 162 is furthermore carried between a roller 165 and a driving sprocket 166 driven by a reversible compressed air motor 167. At the free end of the feed bar which is turned towards the rock face during operation a drill rod guiding mechanism generally indicated by 18 in Figs. 9 and 10 is provided. Said mechanism consists of a slide comprising a cross head 51 and two tubular members 52, 53 forming cylinders parallel with the drill rod 137 and movable on pistons 54 carried by hollow piston rods 55 parallel with the drill rod 137. The tubular members 52, 53 are reciprocated in bearings 56, 57 on the feed bar 133 and the piston rods 55 are secured in brackets 58 on the feed bar 133. The drill rod 137 is guided in guiding means 59 on the feed bar, and, furthermore, in reciprocable guiding means 60 on the cross head 51. The guiding means 59, 60 comprise pairs of levers which may be swung apart for inserting the drill rod and again closed on the drill rod through the action of the piston 61 which against the action of a spring 62 is movable in a cylinder 63. The levers 59, 60 are shaped at their free ends to form a semi-circular jaws which in closed position of the guiding means embrace the drill rod and form guiding sleeves for the drill rod 137. Compressed air supplied through conduits 49 is conveyed through the hollow piston rods 55 into the tubular members 52, 53 and therefrom through tubes 64 to the cylinder 63 the piston of which co-acts with the pair of levers 60 so that the guiding means are closed. The pair of levers 59 are arranged in similar manner. Simultaneously with the closing of the guiding means the cross head 51 is moved longitudinally of the drill rod until it reaches the rock face or is stopped by an abutment 65 which may abut the bearing 57.

For the maneuvering of the feed bar, the rock drill and the other mechanisms cooperating therewith a maneuvering panel 138 is provided on the carriage 97. Compressed air is supplied to said maneuvering panel through a conduit 139 and flushing water through a conduit 140. Not illustrated double hoses connect the maneuvering panel with the motor 103, the motor 112 and the feed bar 133, and single hoses connect the maneuvering panel with the rock drill 136 and the drill rod guiding means 18. A hose for flushing water connects the maneuvering panel with the rock drill 136. All these hoses have been omitted in the drawings in order not to make the drawings too complicated. The valves provided in the maneuvering panel 138 have also been omitted since they are of conventional design, and only the maneuvering means for the various valves are illustrated. The maneuvering means consist of push buttons 141 and 142, Fig. 11, for controlling the supply of compressed air to the motor 103 and for operating said motor ahead or reverse, respectively; furthermore push buttons 143 and 144 serving to control the operation of the motor 112 for turning in one direction or the other. Consequently the operator by pushing one or the other of the buttons 141, 142 may raise or lower the carriage 97 on the column 77 upon operation of the motor 103 forward or reverse, and, furthermore, he may move the sliding member 117 in one direction or the other along the cross bar 96 by operating the motor 112 forward or reverse upon pushing one or the other of the buttons 143, 144. The maneuvering panel 138 is furthermore provided with a handle 145 for controlling the supply of compressed air to the feed bar or cradle for feeding the rock drill toward the rock face and for retracting it therefrom, respectively. The handle 145 may be combined with a valve mechanism 148 which serves to adjust the pressure in one of the hoses to the feed bar for controlling the feed pressure during drilling. Furthermore, the maneuvering panel 138 is provided with an handle 149 for controlling the air supply to the drill rod guiding mechanism for opening and closing said mechanism and with a handle 146 for controlling the air supply to the rock drill. The handle 147 serves to control the supply of flushing water to the rock drill and the drill rod.

It is obvious from the above description that the driller by manipulating the handles 141—149 is capable of moving the feed bars vertically on the column 77 and sideways on the cross bars 96 and that he may move the drills on the feed bars and start and stop the drills and control the flushing water supply as well as the operation of the drill rod guiding mechanism. A maneuvering panel 138 is provided for each feed bar and the maneuvering panels may be disposed on the carriage 97 of each cross bar 96 or they may be grouped at a central place, for instance on the forward end of the trolley 76.

In Fig. 1 the drills 136 and feed bars or cradles 133 are illustrated in several different positions which they may take on the cross bars 96. On the upper left hand bar 96 the feed bar and the drill have the same position relative to the cross bar 96 as illustrated and described in connection with Figs. 2 and 3. On the lower left hand cross bar the sliding member has been moved clear to the end of the cross bar 96. Then the lock bolt 123, Fig. 6, has been disengaged and the feed bar swung 90° outwardly by turning of the fixture 120 on the trunnion 119. The lock bolt 123 has then engaged a new recess 122. With the feed bar in this position drilling may be carried out close to the vertical wall 150. On the lower right hand cross bar the feed bar 133 after moving the sliding member 117 to the free end of the cross bar and disengaging the lock bolt 123 has been swung down 180° by swinging of the fixture 120 on the trunnion 119, so that the feed bar is situated below the cross bar 96. In this position the feed bar may be moved along the cross bar and the drill 136 may drill holes close to the bottom 94 of the tunnel or other space. It is obvious from Fig. 1 that the drill rig according to the invention may handle the drilling of a complete tunnel or mine section, and drilling of holes close to the walls, bottom and roof of the section without the driller having to bother with the heavy handling of feed bars and drills. Naturally, two or more feed bars may be provided on each cross bar 96. After loosening of the bolt 110 the feed bars may be raised or dropped more or less. After tightening the bolt 110 again drilling may be carried out at any incline upwardly or downwardly or vertically as the case may be and according to the position of the cross bar 96 in the clamping member 109.

The embodiment of the invention above described and illustrated on the drawings should be considered only as an example and the details of the invention may be modified in several different ways within the scope of the claims. In the illustrated embodiments compressed air motors 103 and 112 for the parallel displacement of the feed bars vertically or sideways, respectively, have been illustrated. However, within the scope of the invention said motors may be replaced by hydraulic motors driven by a suitable pressure liquid and the controlling means for the motors and the conduits to and from said motors are then arranged for controlling and supplying pressure liquid from a pump or other source of pressure liquid. The motors may also be electric motors.

What I claim is:

1. A drill rig comprising a sub-structure, a column movably mounted on said sub-structure, a carriage slidably mounted on said column, a chain fixed to said column adjacent the end thereof and passing over a sprocket on said carriage, a reversible motor on said carriage for driving said sprocket whereby said carriage may be moved in either direction on said column to any desired position, means for locking said carriage against movement on said column, a tubular bar extending from said carriage substantially at right angles to the longitudinal axis of said column, a lead screw rotatably mounted within said bar, a sliding member received on said bar and having a nut threadedly engaging said lead screw, a second reversible motor on said bar for driving said lead screw whereby the sliding member may be moved in either direction, a fixture rotatably mounted on said sliding member for rotation about an axis substantially at right angles to the longitudinal axis of said bar, means to lock said fixture in a selected position, a feed bar support mounted on said fixture for limited pivotal movement about an axis substantially at right angles to the axis of rotation of said fixture, means to lock said feed bar support in adjusted position, a feed bar removably secured to said feed bar support, a drill motor and drill rod carried by said feed bar, feeding means for said drill motor and drill rod, extensible and retractable drill rod guide means carried by said feed bar, a control panel and control means on said panel for controlling the operation of said first and second reversible motors, said drill motor, said feed bar and said drill rod guide means whereby all drilling operations may be controlled from a single location.

2. A drill rig comprising a sub-structure, a column movably mounted on said sub-structure, a carriage slidably mounted on said column, a chain fixed to said column adjacent the ends thereof and passing over a sprocket on said carriage, a reversible motor on said carriage for driving said sprocket whereby said carriage may be moved in either direction on said column to any desired position, a tubular bar extending from said carriage substantially at right angles to the longitudinal axis of said column, a lead screw rotatably mounted within said bar, a sliding member received on said bar and having a nut threadedly engaging said lead screw, a second reversible motor on said bar for driving said lead screw whereby said sliding member may be moved in either direction, a fixture rotatably mounted on said sliding member for rotation about an axis substantially at right angles to the longitudinal axis of said bar, a feed bar support mounted on said fixture for limited pivotal movement about an axis substantially at right angles to the axis of rotation of said fixture, a feed bar removably secured to said feed bar support, a drill motor and drill rod carried by said feed bar, feeding means for said drill motor and drill rod, extensible and retractable drill rod guide means carried by said feed bar, a control panel and control means on said panel for controlling the operation of said first and second reversible motors, said drill motor, said feed bar and said drill rod guide means whereby all drilling operations may be controlled from a single location.

3. A drill rig comprising a sub-structure, a column movably mounted on said sub-structure, a carriage slidably mounted on said column, a chain fixed to said column adjacent the ends thereof and passing over a sprocket on said carriage, a motor on said carriage for driving said sprocket in either direction whereby said carriage may be moved on said column to any desired position, a bar extending from said carriage substantially at right angles to the longitudinal axis of said column, a lead screw rotatably mounted on said bar, a sliding member received on said bar and having a nut threadedly engaging said lead screw, a second motor on said bar for driving said lead screw whereby said sliding member may be moved in either direction, a feed bar support mounted on said sliding member, a feed bar removably secured to said feed bar support, a drill motor and drill rod carried by said feed bar, feeding means for said drill motor and drill rod, extensible and retractable drill rod guide means carried by said feed bar, a control panel and control means on said panel for controlling the operation of said first and second motors, said drill motor, said feed bar and said drill rod guide means whereby all drilling operations may be controlled from a single location.

4. A drill rig comprising a sub-structure, a column movably mounted on said sub-structure, a carriage slidably mounted on said column, a chain fixed to said column adjacent the ends thereof and passing over a sprocket on said carriage, a motor on said carriage for driving said sprocket in either direction whereby said carriage may be moved on said column to any desired position, a bar extending from said carriage substantially at right angles to the longitudinal axis of said column, a lead screw rotatably mounted on said bar, a sliding member received on said bar and having a nut threadedly engaging said lead screw, a second motor on said bar for driving said lead screw whereby said sliding member may be moved in either direction, a fixture rotatably mounted on said sliding member for rotation about an axis substantially at right angles to the longitudinal axis of said bar, a feed bar support mounted on said fixture for limited pivotal movement about an axis substantially at right angles to the axis of rotation of said fixture, a feed bar removably secured to said feed bar support, a drill motor and drill rod carried by said feed bar, feeding means for said drill motor and drill rod, a control panel and control means on said panel for controlling the operation of said first and second motors, said drill motor and said feed bar whereby all drilling operations may be controlled from a single location.

5. A drill rig comprising a sub-structure, a column movably mounted on said sub-structure, a carriage slidably mounted on said column, means on said carriage for moving said carriage on said column to any desired position, a bar extending from said carriage substantially at right angles to the longitudinal axis of said column, a sliding member received on said bar, means on said bar for moving said sliding member in either direction, a fixture rotatably mounted on said sliding member for rotation about an axis substantially at right angles to the longitudinal axis of said bar, a feed bar support mounted on said fixture for limited pivotal movement about an axis substantially at right angles to the axis of rotation of said fixture, a feed bar removably secured to said feed bar support, a drill motor and drill rod carried by said feedbar, feeding means for said drill motor and drill rod, a control panel and control means grouped at a single location for controlling the operation of said carriage moving means, said sliding member moving means, said drill motor, and said feeding means whereby all drilling operations may be controlled from said single location.

6. A drill rig comprising a substructure, a column movably mounted on said substructure, a carriage slidably mounted on said column, means operably connecting said carriage and column for moving the carriage in either direction on the column to any desired position, a cross bar carried by said carriage and extending substantially transversely to the longitudinal axis of the column, a sliding member movable longitudinally of said cross bar, means operably connecting said sliding member and cross bar for moving the sliding member in either direction on the cross bar to any desired position, a feed bar carried by said sliding member and provided with means for carrying and feeding a drill motor and drill rod on said feed bar, extensible and retractable drill rod guide means carried by said feed bar, and control means grouped at a single location for controlling the operation of said carriage moving means, said sliding member moving means, said feeding means, and said drill rod guide means.

References Cited in the file of this patent

UNITED STATES PATENTS

| | | |
|---|---|---|
| 1,113,531 | Ball et al. | Oct. 13, 1914 |
| 2,053,665 | Hirschberg | Sept. 8, 1936 |
| 2,130,982 | Gartin | Sept. 20, 1938 |
| 2,268,572 | Curtis | Jan. 6, 1942 |
| 2,318,760 | Curtis et al. | May 11, 1943 |
| 2,334,009 | Jeffrey | Nov. 9, 1943 |
| 2,347,499 | Osgood | Apr. 25, 1944 |
| 2,397,755 | Schwab | Apr. 2, 1946 |
| 2,456,745 | Slater | Dec. 21, 1948 |
| 2,523,512 | Nast | Sept. 26, 1950 |